Jan. 11, 1927.
G. SCHMIDT
1,614,319
REFRIGERATOR SHOW CASE
Filed Sept. 29, 1924  2 Sheets-Sheet 1
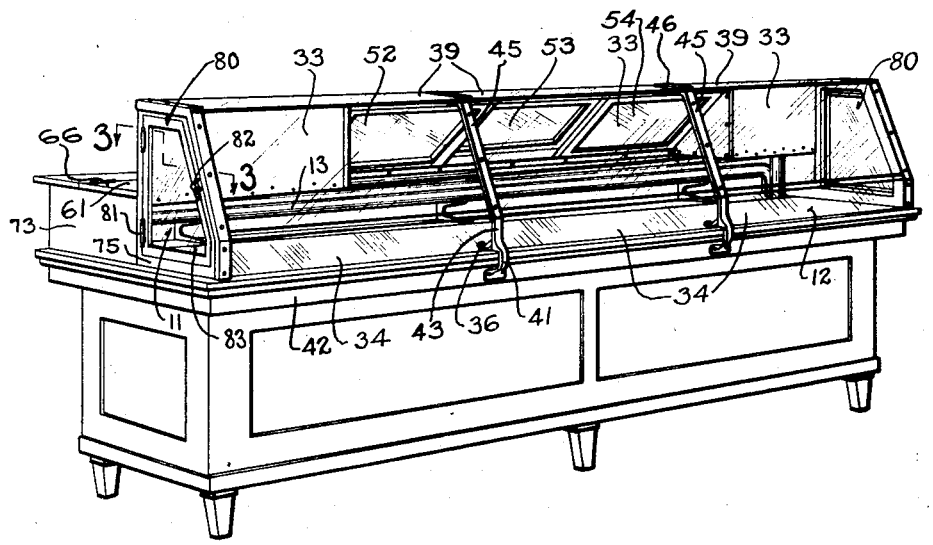
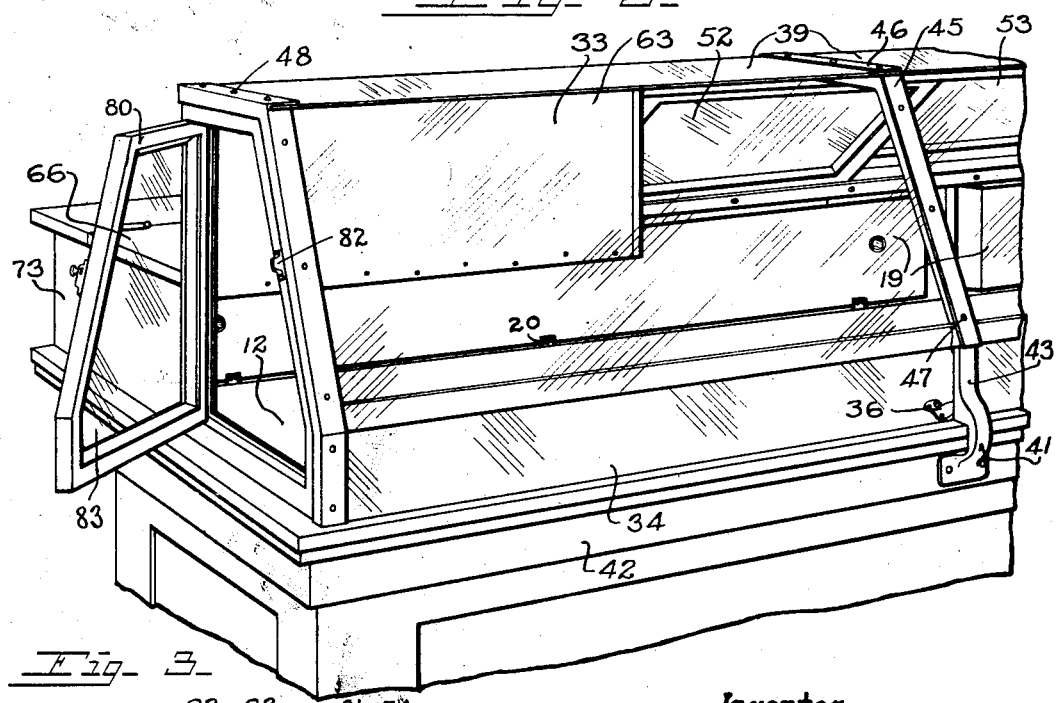
Inventor:
Gustav Schmidt,

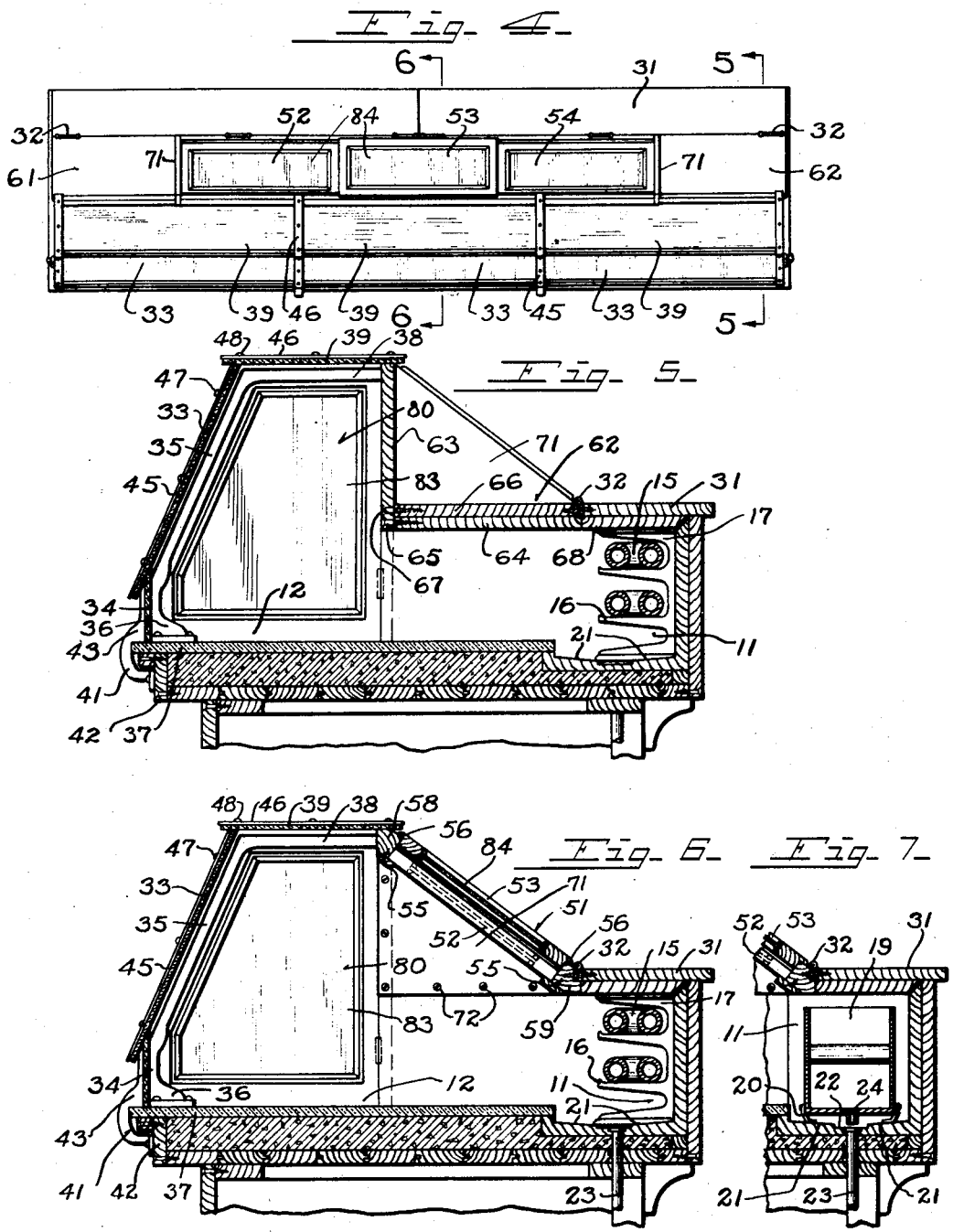

Patented Jan. 11, 1927.

1,614,319

UNITED STATES PATENT OFFICE.

GUSTAV SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

REFRIGERATOR SHOW CASE.

Application filed September 29, 1924. Serial No. 740,428.

My invention relates to refrigerator show cases adapted to contain a refrigerator-space and a display-space, and my invention consists in novel arrangement of said spaces.

My invention consists, further, in providing a refrigerator show case with a rear refrigerator-section and a front display-section, the rear part of the display-section being provided with a sliding door-section and outer shelf means at its rear, as well as an end-door which supplements the sliding doors for convenient access to the interior of the display-section.

My invention consists, further, in providing a rear refrigerator-section and a front display-section of substantially equal lengths, the top of the rear refrigerator-section forming a shelf, and an outer shelf-section supplemental to said shelf above the refrigerator-section and extending into the display-space, and providing the display-section with upwardly slanting sliding doors in line with said outer shelf-section; and, further, to provide an end-door for said display-section for access to the interior of said display-section.

The invention will be further readily understood from the following description and claims, and from the drawings, in which latter:—

Fig. 1 is a perspective view of my improved device, showing refrigerator piping in the refrigerator-section, and showing the end-doors closed.

Fig. 2 is a similar view, partly broken away, showing ice receptacles in the refrigerator-section, and showing the end-door open.

Fig. 3 is a cross-sectional detail of the mounting for the end-door, taken on the line 3—3 of Fig. 1.

Fig. 4 is a plan view of my improved device.

Fig. 5 is a cross-section of the same, taken on the line 5—5 of Fig. 4, and showing refrigerator piping in the refrigerator-section.

Fig. 6 is a cross-section of the same, taken on the line 6—6 of Fig. 4; and,

Fig. 7 is a similar cross-section in the plane of the same section line, showing an ice receptacle in the refrigerator-section.

The show case comprises a refrigerator-section 11 and a front display-section 12. The refrigerator-section is arranged to have a refrigerating agent therein, exemplified in Figs. 1, 5 and 6 as refrigerating piping 15, having suitable connection with a suitable refrigerating machine for supplying the proper refrigerant for the show case. This piping is shown arranged on brackets 16 of a shelf-bracket 17, suitably secured in the refrigerator-section.

In Figs. 2 and 7 the refrigerant is exemplified as arranged to be received, for instance, in the form of ice in ice-receptacles 19, of which there may be a suitable number arranged end to end, preferably two, in the refrigerator-section, the same being provided with feet 20 resting on the bottom of the refrigerator-section.

This bottom is represented sloping, as at 21, toward the median portion of the refrigerator-section. There is a gutter 22 in in this bottom. The gutter extends lengthwise of the refrigerator-section, and has an outlet-pipe 23 communicating therewith for leading the waste from the refrigerant or fluid contents of the show case away from the same. When ice receptacles are employed, the same may be provided with drain-nipples 24 leading to said gutter.

The top of the refrigerator-section is formed by a shelf 31, which is shown in sections extending lengthwise of the refrigerator-section and hinged by hinges 32 to the show case.

The display-section 12 is located in front of the refrigerator-section, and comprises an upwardly and rearwardly slanting transparent front wall 33, at the bottom of which there is an upright transparent front wall 34, these walls being formed of glass supported by brackets 35 at their inner faces, said brackets being provided with feet 36 secured to the bottom 37 of the display-section, these brackets having rearwardly extending horizontal branches 38, forming brackets on which an upper transparent top-wall 39 for the display-section is supported, this upper transparent top being exemplified as of glass and serving as a shelf for the top of the display-section.

A bracket-piece 41 is secured to the front wall 42 of the bottom of the display-section and has an upwardly extending portion 43 received in front of the lower upright wall 34. Cleats 45, 46, are received at the outsides of the transparent walls 33, 39, and have screws 47, 48, received therethrough into the brackets 35, 38, for securing said walls in place.

The rear portion of the display-section comprises an upwardly inclined door-section 51, which is shown provided with sliding doors 52, 53, 54, which slant upwardly and forwardly and are arranged to slide respectively on guides 55, 56, the doors 52, 54, being arranged to slide under the door 53, and the door 53 being arranged to slide above the doors 52, 54.

The guides are located on bars 58, 59, extending lengthwise of the display-section.

The sliding door-section is exemplified as extending only part-way throughout the length of the display-section, being interrupted at the ends of the display-section, where outer rear shelf-sections 61, 62, are formed. These outer shelf-sections are in line with the sliding door-section. They are exemplified as comprising a front wall 63, a bottom 64 fixed to the front wall by screws 65, and a shelf 66 on said bottom, and fixed to said front wall by screws 67. The bottom and shelf form a double thickness between the front portion of the display-section and the refrigerating section for insulating purposes. The hinges 32 have their butts secured respectively to said shelf and the shelves 31 forming the top of the refrigerator-section, the said hinged shelves being provided with an insulating layer 68.

Each of the outer shelf-sections is provided with an end-wall 71, fixed to the front wall 63 and the bottom 64 respectively by screws 72.

The outer ends of the shelves 66 are supported by and fixed to the end walls 73 of the refrigerator case, and the front walls 63 are further supported and fixed, as by screws 74, to the framing 75 in said end walls.

The bars 58, 59, extend lengthwise between the end walls 71 of said rear shelf-sections, the ends of said bars being secured to said end walls in suitable manner.

The rear shelf-sections or compartments provide supports on which the wrapping of purchases may take place, or on which a stand for wrapping paper may be supported, or which may support a cash register or other suitable device, or be employed for other purposes for convenience in the sale of goods from said refrigerator show case.

The rear sliding doors, which extend upwardly in forward direction, form ready means for access to the interior of the display-section immediately in front thereof, and also in front of and below the inner ends of the outer shelf-sections.

In order to provide ready access to the ends of the display-section, and especially in an arrangement wherein the rear portions of the ends of the display-sections are occupied by outer shelf-sections, I provide an end-door 80, of which one is shown at each end of the show-case, which is hinged as by hinges 81 to the door-framing 75. It may be closed by a lock 82. This door-framing preferably corresponds in shape to the shape of the end of the display section located in front of the rear shelf-section, having the major portion of its front wall sloping upwardly and rearwardly, providing substantially full access to the end of the display-section exposed at said end-wall.

The door preferably comprises a transparent panel 83, suitably secured in the door-framing, so that the goods in the end of the display-section may be readily viewed from the end of the show case.

The front wall of the display-section slopes upwardly and rearwardly, and preferably comprises the transparent sheets of glass 33, and the rear wall of the display-section, namely, the door-section, slopes upwardly and forwardly, the doors having transparent sheets 84 of glass therein, so that the contents of the display section may be readily viewed from the rear or merchant's side of the refrigerator show case, while the top of the display-section, which is narrow, is also preferably formed of transparent sheets of glass, so that the contents of the display case may be readily viewed in pleasing manner from the top.

The upwardly rearwardly sloping front wall and the upwardly forwardly sloping rear wall of the display-section render the contents of the display-section readily viewable to the customer from the front and readily accessible to the merchant at the rear, while the end-doors make such portions of the contents of the display-section in front of the outer shelf-sections readily accessible.

Having thus fully described my invention, what I claim as new, and desire to secure by Letters Patent, is:

1. A refrigerator show case comprising a rear refrigerator-section, a rear outer shelf above said refrigerator-section, a refrigeration-agent containing means under said rear outer shelf and in said refrigerator-section, a rear outer shelf-section shorter than said outer shelf and located in front of said outer shelf, a front display-section the lower portion of which is on a level with said refrigerator-section and the upper portion of which extends above the level of said refrigerator-section and in front of and endwise of said rear outer shelf-section, said front display-section comprising a rear door-section in endwise line with said rear outer shelf-section and a transparent front, an end-wall for said front display-section, said end wall comprising a door-opening extending substantially throughout the height of said front display-section, and an end door arranged to open and close said door-opening and extending above and below the level of said rear outer shelf.

2. A refrigerator show case comprising a refrigerator-section at its rear and a display-section at its front, an outer shelf above said refrigerator-section extending throughout the length of said display-section, refrigeration-agent containing means under said outer shelf in said refrigerator section, said display-section comprising a rear upwardly and forwardly inclined sliding door-section in front of said outer shelf, said door-section being shorter than said outer shelf, a rear outer shelf-section in front of said outer shelf and in line with said sliding door-section in the direction of length of said show case, said rear outer shelf-section projecting into said display-section with said display-section continued in front of said rear outer shelf-section, said display-section comprising a transparent front wall and an end wall having a door-opening, and an end door in said end wall to open and close said door-opening, said door-opening and said end door extending above and below the level of said outer shelf and having an upper portion in the level of said first-named door-section.

3. A refrigerator show case comprising a refrigerator-section at its rear and a display-section at its front, an outer shelf above said refrigerator-section extending along the rear of said display-section, refrigeration-agent containing means under said outer shelf in said refrigerator-section, said display-section comprising a rear upwardly and forwardly inclined door-section in front of said outer shelf, a transparent top, and a transparent upwardly and rearwardly inclined front wall, said door-section being shorter than said outer shelf, a rear outer shelf-section in front of said outer shelf and in line with said door-section in the direction of length of said show case, said rear outer shelf-section projecting into said display-section with said display-section continued in front of said rear outer shelf-section, said display-section comprising an end wall having an end door-opening the upper portion of which is in the level of said rear door-section, and an end-door arranged to open and close said door-opening, said end door and said end door-opening extending above and below the level of said outer shelf.

In testimony whereof, I have hereunto signed my name.

GUSTAV SCHMIDT.